United States Patent
Cardella et al.

(10) Patent No.: US 10,837,700 B2
(45) Date of Patent: Nov. 17, 2020

(54) HYDROGEN-NEON MIXTURE REFRIGERATION CYCLE FOR LARGE-SCALE HYDROGEN COOLING AND LIQUEFACTION

(71) Applicant: LINDE AKTIENGESELLSCHAFT, Munich (DE)

(72) Inventors: Umberto Cardella, Baldham (DE); Lutz Decker, Winterthur (CH); Harald Klein, Wolfratscausen (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 37 days.

(21) Appl. No.: 15/771,467

(22) PCT Filed: Oct. 20, 2016

(86) PCT No.: PCT/EP2016/075231
§ 371 (c)(1),
(2) Date: Apr. 27, 2018

(87) PCT Pub. No.: WO2017/072024
PCT Pub. Date: May 4, 2017

(65) Prior Publication Data
US 2018/0313604 A1    Nov. 1, 2018

(30) Foreign Application Priority Data
Oct. 27, 2015   (EP) .................... 15003071

(51) Int. Cl.
*F25J 1/00*   (2006.01)
*C09K 5/04*   (2006.01)
*F25J 1/02*   (2006.01)

(52) U.S. Cl.
CPC ............. *F25J 1/0067* (2013.01); *C09K 5/041* (2013.01); *F25J 1/001* (2013.01); *F25J 1/005* (2013.01);
(Continued)

(58) Field of Classification Search
CPC .. F25J 1/02; F25J 1/0042; F25J 1/0045; F25J 1/0052; F25J 1/001; F25J 1/0067; F25J 2215/10; F25J 2270/902
See application file for complete search history.

(56) References Cited

U.S. PATENT DOCUMENTS

| | | |
|---|---|---|
| 4,765,813 A | 8/1988 | Gaumer et al. |
| 5,144,806 A | 9/1992 | Frenzel et al. |

(Continued)

FOREIGN PATENT DOCUMENTS

| | | | |
|---|---|---|---|
| DE | 102013005923 A1 | 10/2014 | |
| EP | 0342250 A1 | 11/1989 | |
| JP | H08159654 A | * 6/1996 | ............... F25J 1/001 |

OTHER PUBLICATIONS

JPH08159654A Translation (Year: 1996).*

(Continued)

*Primary Examiner* — Brian M King
(74) *Attorney, Agent, or Firm* — Millen, White, Zelano & Branigan, P.C.

(57) ABSTRACT

The present invention relates to a refrigerant composition comprising neon and hydrogen. The present invention further relates to the use of the refrigerant composition in liquefying gaseous substances such as hydrogen or helium.

22 Claims, 1 Drawing Sheet

(52) U.S. Cl.
CPC ........... *F25J 1/0042* (2013.01); *F25J 1/0052* (2013.01); *F25J 1/0062* (2013.01); *F25J 1/0065* (2013.01); *F25J 1/0072* (2013.01); *F25J 1/0092* (2013.01); *F25J 1/0095* (2013.01); *F25J 1/0205* (2013.01); *F25J 1/025* (2013.01); *F25J 1/0207* (2013.01); *F25J 1/0214* (2013.01); *F25J 1/0215* (2013.01); *F25J 1/0217* (2013.01); *F25J 1/0218* (2013.01); *F25J 1/0221* (2013.01); *F25J 1/0259* (2013.01); *F25J 1/0268* (2013.01); *F25J 1/0279* (2013.01); *F25J 1/0288* (2013.01); *F25J 1/0291* (2013.01); *F25J 1/0292* (2013.01); *F25J 1/0294* (2013.01); *C09K 2205/13* (2013.01); *F25J 2205/60* (2013.01); *F25J 2210/42* (2013.01); *F25J 2210/62* (2013.01); *F25J 2230/08* (2013.01); *F25J 2230/30* (2013.01); *F25J 2240/02* (2013.01); *F25J 2240/40* (2013.01); *F25J 2270/14* (2013.01); *F25J 2270/16* (2013.01); *F25J 2270/90* (2013.01)

(56) References Cited

U.S. PATENT DOCUMENTS

| | | | | |
|---|---|---|---|---|
| 6,523,366 | B1* | 2/2003 | Bonaquist | F25B 9/002 62/613 |
| 2008/0196587 | A1* | 8/2008 | Ha | F25J 3/0266 95/204 |
| 2010/0083695 | A1* | 4/2010 | Kundig | F25J 1/001 62/607 |
| 2014/0053598 | A1* | 2/2014 | Ishimaru | F01D 15/005 62/606 |

OTHER PUBLICATIONS

International Search Report for PCT/EP2016/075231 dated Feb. 3, 2017.

Quack, H, "Conceptual Design of a High Efficiency Large Capacity Hydrogen Liquefier," AIP Conference Proceedings, Jul. 16, 2001, vol. 47, No. 1, pp. 255-263.

Walnum, H. T. et al., "Principles for the liquefaction of hydrogen with emphasis on precooling processes," Sep. 1, 2012.

Hood, C. B. et al., "A Hydrogen Liquefier Using Neon as an Intermediate," The Review of Scientific Instruments, Jul. 7, 1952, vol. 23, No. 7, pp. 357-361.

English Abstract of DE102013005923, Publication Date: Oct. 9, 2014.

* cited by examiner

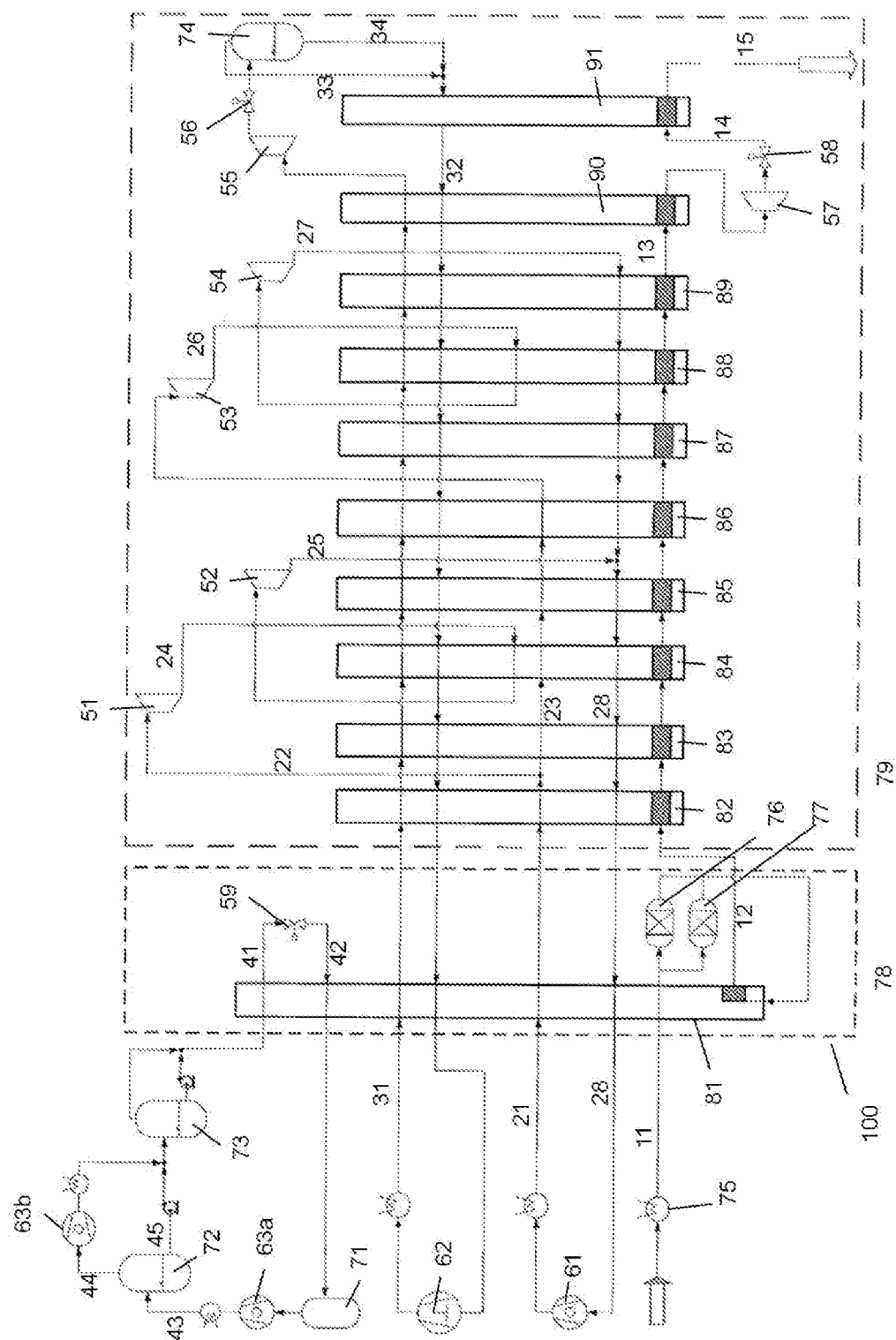

HYDROGEN-NEON MIXTURE REFRIGERATION CYCLE FOR LARGE-SCALE HYDROGEN COOLING AND LIQUEFACTION

The present invention relates to methods for liquefying gaseous streams, particularly gaseous streams consisting of or comprising hydrogen or helium.

New large-scale hydrogen liquefaction plants with production capacities of, for instance, up to 150 tpd will require thermodynamically and economically efficient process designs. Specific energy consumption, and thus operational costs, has to be significantly reduced compared to prior concepts described in in Ohlig et al. ("Hydrogen, 4. Liquefaction" Ullmanns's Encyclopedia of Industrial Chemistry, edited by F. Ullmann, Wiley-VCH Verlag, 2013), EP0342250A1 and JPH09303954A, while utilizing process equipment and frame sizes that are available.

The main technical difficulty in the up scaled hydrogen liquefiers is the design of efficient turbo expanders and compressors in the refrigeration cycle. For liquefaction rates above 50 tpd, the hydrogen refrigeration cycle design in the prior art (for example, the Linde Leuna plant, a hydrogen liquefier with 5 tpd capacity or Ohlig et al. ("Hydrogen, 4. Liquefaction" Ullmanns's Encyclopedia of Industrial Chemistry, edited by F. Ullmann, Wiley-VCH Verlag, 2013)) is practically limited through the maximal volumetric flow (frame size) of available reciprocating compressors. While two very large reciprocating compressors running in parallel can be operated and maintained, a higher number of parallel running very large machines is not industrially viable due to economical and operational disadvantages e.g. increased installation costs, additional land requirements, high plant maintenance complexity and downtimes. This is also the case for helium refrigeration cycles, because of the limited maximal capacity of helium reciprocating compressors and the low isentropic efficiencies of available helium screw-compressors. Turbo-compressors allow for higher volumetric suction flows. However, at suction temperatures close to ambient, stage pressure ratios for light gases such as helium and hydrogen are low for blade tip speeds that are feasible today. Multi-stage turbo-compressors are designed with up to 6 or 8 stages. Thus, the pressure ratios in cold refrigeration cycles containing pure helium and hydrogen require turbo-compressors with an unfavourable, as described in IDEALHY study (2012, http://www.idealhy.eu), or even not viable high number of compressor stages.

For the cold refrigeration cycle, turbo-expanders with high isentropic efficiencies which are designed with energy recovery, i.e. via turbo-generators or booster compressors, are crucial to increase the overall process efficiency. However, energy and cost efficient turbo-expanders are currently limited by feasible rotational speeds and available frame-sizes.

Refrigeration fluids providing cooling down to temperatures below approximately 60 K and close to the liquid hydrogen product are limited to hydrogen, helium and neon as well as to mixtures of these. Both normal boiling point (27.1 K) and melting point (24.6 K) of Neon are higher than the normal boiling point of hydrogen (20.3 K). Hence, in order to avoid freeze-out within the process equipment, cold refrigeration cycles with pure neon or mixtures with high neon contents are not designed to reach temperatures close or lower to 24.6 K. In order to precool gases such as hydrogen to temperatures under 30 K, pure neon Brayton cycles will have to be designed with a low pressure expansion stage below 2 bar(a). The warming up low pressure streams result in very high suction volumetric flows for the refrigerant compressors at the warm end, with increased frame-size and costs.

Thus, it is the objective of the present invention to provide a method for efficient and economic liquefying gas streams, particularly suitable for large scales.

The objective is solved by the appended claims.

According to one aspect, a refrigerant composition is provided for use in the method described below, wherein the refrigerant composition comprises neon and hydrogen.

The refrigerant composition is particularly useful for refrigerants that are designed to cool fluid streams from ambient temperature to lower temperatures below 50 K, particularly below 33 K. This is achieved by pressurizing such refrigerants and expanding under cooling of the refrigerant, particularly to the above-mentioned temperature range, thereby producing cold. Particularly, such refrigerants may advantageously be used as cooling refrigerants in process such as the liquefactions of gases such as hydrogen or helium.

In certain embodiments, the refrigerant composition of the invention consists of or comprises:
10 mol. % to 90 mol. % neon and hydrogen, or
20 mol. % to 80 mol. % neon and hydrogen, or
30 mol. % to 70 mol % neon and hydrogen, or
40 mol. % to 60 mol % neon and hydrogen, or
30 mol. % to 40 mol % neon and hydrogen, or
40 mol. % to 50 mol % neon and hydrogen, or
10 mol. % to 20 mol. % neon and hydrogen, or
50 mol. % to 90 mol. % neon and hydrogen or
40 mol. % to 70 mol. % hydrogen and neon, particularly 50 mol. % to 70 mol. % hydrogen and neon, more particular 55 mol. % to 65 mol. %.

In certain embodiments, the refrigerant composition of the invention consists of:
90 mol. % neon and 10 mol. % hydrogen, or
80 mol. % neon and 20 mol. % hydrogen, or
70 mol. % neon and 30 mol. % hydrogen, or
60 mol. % neon and 40 mol. % hydrogen, or
50 mol. % neon and 50 mol. % hydrogen, or
40 mol. % neon and 60 mol. % hydrogen, or
30 mol. % neon and 70 mol. % hydrogen, or
20 mol. % neon and 80 mol. % hydrogen, or
10 mol. % neon and 90 mol. % hydrogen, or
55 mol. % hydrogen and 45 mol. % neon, or
65 mol. % hydrogen and 35 mol. % neon.

The refrigerant composition may comprise a mixture of neon and hydrogen, wherein the mixture of neon and hydrogen has a molecular weight in the range of 3.83 g/mol to 13 g/mol.

The refrigerant composition may comprise a mixture of neon and hydrogen has a molecular weight in the range of 6.5 g/mol to 11.2 g/mol.

The refrigerant composition of the invention is used as a cooling refrigerant, for liquefaction of a gaseous substance is provided.

In certain embodiments, the gaseous substance is hydrogen or helium.

According to another aspect of the invention, a method for liquefying a feed gas comprising hydrogen or heliumis provided according to claim 1. The method comprises the steps of:
providing a feed gas stream comprising the feed gas, wherein the feed gas stream is has an initial temperature,
precooling the feed gas stream to an intermediate temperature in a precooling step yielding a precooled feed gas stream, wherein particularly the intermediate temperature is in the range of 70 K to 150 K, and cooling the precooled feed gas stream to a temperature equal or below the boiling temperature or the critical temperature of the gas, wherein the precooled feed gas stream is cooled to the temperature equal or below the boiling temperature or the critical temperature of the gas in a first cooling step with a first refrigerant stream, wherein the first refrigerant stream is expanded, thereby producing cold, or the precooled feed gas stream is cooled to a first temperature in a first cooling step with a first refrigerant stream, wherein the first refrigerant stream is expanded, thereby producing cold, and the cooled feed gas stream is further cooled from the first temperature to the temperature equal or below the boiling temperature or the critical temperature of the gas in a second cooling step with a second refrigerant stream, wherein the second refrigerant stream is expanded, thereby producing cold, wherein the first refrigerant stream and/or the second refrigerant stream consists of or comprises the refrigerant composition as described above. The refrigerant composition comprises hydrogen and helium.

The refrigerant composition may essentially consist of hydrogen or helium The refrigerant composition may comprise a mixture of neon and hydrogen, wherein the mixture of neon and hydrogen has a molecular weight in the range of 3.83 g/mol to 13 g/mol.

The refrigerant composition may comprise a mixture of neon and hydrogen has a molecular weight in the range of 6.5 g/mol to 11.2 g/mol.

The term boiling temperature refers to the temperature at which the gas liquefies or begins to liquefy. The boiling temperature is dependent on the pressure of the gas.

In certain embodiments, the gas comprised within the feed gas stream is hydrogen or helium. In certain embodiments, the feed gas stream consists of hydrogen or helium.

Particularly, if the gas to be liquefied is hydrogen, ortho hydrogen comprised within the feed gas stream (typically about 75%) is preferably converted to higher para hydrogen fractions preferably before liquefaction of the feed gas stream to avoid that the exothermic ortho to para reaction takes place in the liquid product possibly resulting in an undesired partial vaporization of the liquid hydrogen product during storage and transport.

In certain embodiments, the precooled feed gas stream is cooled to the temperature equal or below the boiling temperature or the critical temperature of the gas in the first cooling step, particularly in a first cooling zone, by a first closed loop cooling cycle with the first refrigerant stream, wherein the first refrigerant stream is expanded, thereby producing cold, and wherein particularly the first refrigerant stream consists of or comprises 10 mol. % to 20 mol. % neon and hydrogen, and wherein particularly the temperature equal or below the boiling temperature or the critical temperature of the gas is equal or above 25 K.

In certain embodiments, the precooled feed gas stream is cooled to the first temperature in the first cooling step, particularly in the first cooling zone, by a first closed loop cooling cycle with the first refrigerant stream, wherein the first refrigerant stream is expanded, thereby producing cold.

In certain embodiments, the cooled feed gas stream is cooled from the first temperature to the temperature equal or below the boiling temperature or the critical temperature of the gas in the second cooling step, particularly in a second cooling zone, by a second closed-loop cooling cycle with the second refrigerant stream, wherein the second refrigerant stream is expanded, thereby producing cold.

In certain embodiments, the precooled feed gas stream is cooled to a first temperature in a first cooling step by a first closed-loop cooling cycle with a first refrigerant stream, wherein the first refrigerant stream is expanded, thereby producing cold, and the cooled feed gas stream is further cooled from the first temperature to the temperature equal or below the boiling temperature or critical temperature of the gas, in a second cooling step by a second closed loop cooling cycle with a second refrigerant stream, (preferably comprising or consisting of hydrogen and/or helium), wherein the second refrigerant stream is expanded, thereby producing cold.

In certain embodiments, the second refrigerant stream consists or comprises: hydrogen, helium or a mixture of hydrogen and helium.

In certain embodiments, the second refrigerant stream consists of or comprises a refrigerant composition of the invention comprising or consisting of 10 mol. % to 20 mol. % neon and hydrogen, particularly provided that the temperature equal or below the boiling temperature or the critical temperature of the gas is equal or above 25 K.

In certain embodiments, the feed gas stream is precooled to the intermediate temperature in a precooling zone.

In certain embodiments, the first refrigerant stream is precooled to the intermediate temperature, particularly in the above-mentioned precooling zone.

In certain embodiments, the first temperature lies in the range of 24.6 K to 44.5 K, particularly in the range of 26 K to 33 K.

In certain embodiments, the intermediate temperature is in the range of 70 K to 120 K. In certain embodiments, the intermediate temperature is in the range of 80 K to 120 K. In certain embodiments, the intermediate temperature is in the range of 85 K to 120 K. In certain embodiments, the intermediate is in the range of 90 K to 120 K. In certain embodiments, the intermediate temperature is between 95 K and 110 K, particularly around 100 K.

In certain embodiments, the intermediate temperature is in the range of 120 K to 140 K.

In certain embodiments, the precooling zone is located within an at least one precooling heat exchanger or a precooling block of a heat exchanger. In certain embodiments, the at least one precooling heat exchanger is a plate fin heat exchanger or a coil-wound heat exchanger.

In certain embodiments, the first cooling cycle comprises the steps of:

providing the first refrigerant stream with a first pressure, separating the first refrigerant stream at least into a first partial stream and a second partial stream, expanding the first partial stream in a first expansion device to a first intermediate pressure yielding an partially expanded first partial stream and/or to a second pressure yielding an expanded first partial stream, expanding the second partial stream to a third pressure in a second expansion device yielding an expanded second partial stream, guiding the expanded second partial stream and the precooled feed gas stream such that heat can indirectly be transferred between the expanded second partial stream and the precooled feed gas stream, thereby particularly cooling the feed gas stream to the first temperature or to the temperature equal or below the boiling temperature or the critical temperature of the gas, particularly in the first cooling zone, merging the partially expanded first partial stream or the expanded first partial stream with the expanded second partial stream after being guided with the precooled feed gas stream yielding an expanded first refrigerant stream, and compressing the expanded first refrigerant stream to the first pressure yielding the first refrigerant stream.

The term "indirectly heat transfer" in the context of the present invention refers to the heat transfer between at least two fluid streams that are spatially separated such that the at least two fluid streams do not merge or mix but are in thermal contact, e.g. two fluid streams are guided through two cavities, for example of a plate heat exchanger, wherein the cavities are separated from each other by a wall or plate, and both streams do not mix, but heat can be transferred via the wall or the plate.

Alternatively, the expanded second partial stream is compressed to a pressure close or equal to the first intermediate pressure, and the partially expanded first partial stream is guided into or unified with the second partial stream after compression to the pressure close to the first intermediate pressure yielding a partially expanded first refrigerant stream, which is then particularly compressed to the first pressure yielding the first refrigerant stream.

In certain embodiments, the expanded first refrigerant stream and the precooled feed gas stream are guided such that heat can indirectly be transferred between the expanded first refrigerant stream and the precooled feed gas stream, thereby particularly cooling the precooled feed gas stream, particularly in the first cooling zone.

In certain embodiments, the expanded first refrigerant stream and the first refrigerant stream are guided such that heat can indirectly be transferred between the expanded first refrigerant stream and the first refrigerant stream, thereby particularly cooling the first refrigerant stream, particularly in the first cooling zone.

In certain embodiments, the first refrigerant expansion devices comprise at least one turbo-expander. In certain embodiments, the first expansion device comprises at least two turbo-expanders, wherein particularly the first partial stream is expanded in a first turbo-expander to the first intermediate pressure yielding the partially expanded first partial stream, and the partially expanded first partial stream is expanded in a second turbo-expander to the second pressure.

In certain embodiments, the the partial stream is expanded to the first intermediate pressure yielding the partially expanded first partial stream, and the partially expanded first partial stream and the second partial stream are guided such that heat can indirectly be transferred between the partially expanded first partial stream and the second partial stream, thereby particularly cooling the second partial stream, and the partially expanded first partial stream is further expanded to the second pressure yielding the expanded first partial stream.

In certain embodiments, the second partial stream is expanded to a second intermediate pressure yielding a partially expanded second partial stream, the partially expanded second partial stream and the precooled feed gas stream and/or the second refrigerant stream are guided such that heat can indirectly be transferred between the partially expanded second partial stream and the precooled feed gas stream and/or the second refrigerant stream, and wherein particularly the partially expanded second partial stream is expanded to the third pressure yielding the expanded second partial stream.

In certain embodiments, the first refrigerant stream comprises or consists of 50 mol. % to 90 mol. % neon, and hydrogen, particularly in a concentration up to 50 mol. %. In certain embodiments, the first refrigerant stream comprises or consists of 20 mol. % to 90 mol. % neon, and hydrogen, particularly up to 80 mol. %. In certain embodiments, the first refrigerant stream comprises 30 mol. % to 70 mol. % neon, and hydrogen, particularly up to 70 mol. %. In certain embodiments, the first refrigerant stream consists of 30 mol. % to 70 mol. % neon and hydrogen. In certain embodiments, the first refrigerant stream comprises 40 mol. % to 60 mol. % neon, and hydrogen, particularly up to 60 mol. %. In certain embodiments, the first refrigerant stream consists of 40 mol. % to 60 mol. % neon and hydrogen.

In certain embodiments, the first refrigerant stream comprises or consists of 20 mol. % to 90 mol. % neon, particularly 30 mol. % to 70 mol. % neon, even more particular 40 mol. % to 60 mol. % neon, and hydrogen.

In certain embodiments, the first refrigerant stream comprises or consists of 60 mol. % hydrogen, and up to 40 mol. % neon.

In certain embodiments, the first pressure (high pressure level) is above 5 bar(a), particularly in the range of 10 bar(a) and 80 bar(a), more particularly between 20 bar(a) and 60 bar(a), the first intermediate pressure is between the first pressure and the third pressure, and the second and/or third pressure (low pressure level) is above 0.7 bar(a), particularly above the ambient pressure, more particular in the range between 1.1 bar(a) and 13 bar(a), particularly provided that the first refrigerant is precooled to a precooling temperature in the range of 70 K to 120 K, particularly 100 K.

In certain embodiments, the first refrigerant stream comprises 30 mol. % to 40 mol. % neon, and up to 60 mol. % to 70 mol. % hydrogen, the first pressure is above 20 bar(a), particularly between 30 bar(a) and 40 bar(a), the second and/or third pressure is above 4 bar(a), particularly between 4 bar(a) and 6 bar(a), particularly provided that the first refrigerant is precooled to a precooling temperature in the range of 90 K to 120 K, particularly 100 K.

In certain embodiments, the first refrigerant stream comprises 30 mol. % to 40 mol. % neon, and up to 60 mol. % to 70 mol. % hydrogen, the first pressure is above 40 bar(a), particularly between 50 bar(a) and 80 bar(a), the second and/or third pressure is above 6 bar(a), particularly between 8 bar(a) and 12 bar(a), particularly provided that the first refrigerant is precooled to a precooling temperature in the range of 90 K to 120 K, particularly 100 K.

In certain embodiments, the first refrigerant stream comprises 40 mol. % to 50 mol. % neon, and up to 50 mol. % to 60 mol. % hydrogen, the first pressure is above 15 bar(a), particularly between 20 bar(a) and 40 bar(a), the second and/or third pressure is above 2 bar(a), particularly between 2 bar(a) and 5 bar(a), particularly provided that the first refrigerant is precooled to a precooling temperature in the range of 90 K to 120 K, particularly 100 K.

In certain embodiments, the first refrigerant stream comprises 40 mol. % to 50 mol. % neon, and up to 50 mol. % to 60 mol. % hydrogen, the first pressure is above 30 bar(a), particularly between 40 bar(a) and 80 bar(a), the second and/or third pressure is above 5 bar(a), particularly between 6 bar(a) and 11 bar(a), particularly provided that the first refrigerant is precooled to a precooling temperature in the range of 90 K to 120 K, particularly 100 K.

In certain embodiments, the first refrigerant stream comprises 80 mol. % to 90 mol. % hydrogen and 10 mol. % to 20 mol. % neon. In certain embodiments, the first refrigerant stream consists of 80 mol. % to 90 mol. % hydrogen and neon, the first pressure is above 20 bar(a), particularly in the range of 20 bar(a) and 80 bar(a), and the second and/or the third pressure is above 0.7 bar(a), particularly above the ambient pressure, more particular in the range between 1.1 bar(a) and 13 bar(a), particularly provided that the first refrigerant is precooled to a precooling temperature in the range of 70 K to 120 K, particularly 100 K.

Advantageously, if a higher neon mole fraction is present in the first refrigerant stream (higher molecular weight), a favourable turbo machine design particularly in terms of feasible stage pressure ratio in turbo-compressor or turbo-expanders can be applied.

Advantageously, if a higher hydrogen mole fraction in present in the first refrigerant stream (lower molecular weight), a higher low pressure level is feasible at the discharge of the coldest turbine for the same cooling temperature. Additionally, hydrogen is characterized by a significantly lower heat capacity ratio compared to neon (and helium), resulting in lower compressor discharge temperatures. Thus, a higher energy-efficiency can be realized.

In certain embodiments, the expanded second partial stream is characterized by a temperature in the range of 26 K to 33 K, wherein particularly the precooled feed gas stream and/or the second refrigerant stream is cooled by the expanded second partial stream close to those temperatures.

In certain embodiments, the expanded first refrigerant stream is compressed with a suction temperature close to ambient temperature, or in the range of 230 K to 313 K, or in cold-compressors at a temperature in the range of 80 K to 120 K, or in the range of 120 K to 230 K, particularly above the precooling or intermediate temperature, e.g. 150 K. In certain embodiments, the expanded first refrigerant stream is compressed in a multi stage compressor comprising at least three compressor stages with intercooling.

In certain embodiments, the expanded second partial stream is characterized by a temperature in the range of 24.6 K to 33 K, particularly provided that the first refrigerant consists of 60 mol. % to 90 mol. % hydrogen, and neon, particularly up to 40 mol. %.

In certain embodiments, the first refrigerant stream and the expanded first refrigerant stream and/or the expanded second partial stream is compressed with a suction temperature close to ambient temperature, or in the range of 230 K to 313 K in at least one multi-stage turbo compressors.

Generally, compressing an expanded refrigerant stream, such as the above mentioned expanded first refrigerant stream, at a temperature below the ambient temperature, particularly at temperature in the range of 80 K to 230 K, has the advantage that the volume of the stream to be compressed is reduced, thereby smaller compressors and smaller capital costs are required. Further, advantageously, typically less compressor stages are required due to higher feasible stage pressure ratios with decreasing suction temperature e.g. in turbo machines.

In certain embodiments, the second cooling cycle comprises the steps of:
 providing the second refrigerant stream with a fourth pressure,
 expanding the second refrigerant stream in a third expansion device to a fifth pressure yielding an expanded second refrigerant stream that is particularly characterized by a temperature in the range of 16 K and 30 K, more particular in the range of 20 K and 24 K,
 guiding the expanded second refrigerant stream and the cooled feed gas stream in the second cooling zone such that heat can indirectly be transferred between the streams, thereby particularly cooling the cooled feed gas stream to the temperature equal or below the boiling temperature or the critical temperature of the gas,
 compressing the expanded second refrigerant stream to the fourth pressure yielding the second refrigerant stream.

In certain embodiments, the second refrigerant stream is precooled to the intermediate temperature.

In certain embodiments, the third expansion device is a turbo-expander or piston-expander, a throttle valve or a combination of a turbo-expander or piston-expander and a throttle valve.

In certain embodiments, the second refrigerant comprises essentially hydrogen, the fourth pressure is equal or above 15 bar(a), preferably between 15 bar(a) and 30 bar(a) and the fifth pressure (particularly after expansion device and throttle valve) is below the critical pressure of hydrogen, preferably between 1.0.bar(a) and 2 bar(a), wherein particularly the expanded second refrigerant is characterized by a temperature in the range of 18 K and 30 K, particularly after expansion in a turbo-expander or piston expander and a throttle valve, particularly in the range of 20 K and 24 K.

In certain embodiments, the second refrigerant comprises essentially helium, the fourth pressure is above 20 bar(a), preferably between 20 bar(a) and 100 bar(a), more preferably between 50 bar(a) and 70 bar(a), and the fifth pressure is above 5 bar(a)), preferably in the range of 12 bar(a) and 25 bar(a). Advantageously, such second refrigerant can directly be expanded to the fifth pressure in a single turbo-expander without formation of a two-phase fluid, whereby additionally a phase separator can be saved. Advantageously, in this way, a low hydrogen feed storage temperature can be reached, particularly below 20 K. In certain embodiments, the second refrigerant comprises essentially helium, and the expanded second refrigerant is compressed in an ionic liquid piston compressor.

In certain embodiments, the second cooling zone is located within at least one heat exchanger or a block of the at least on cooling heat exchanger, through which particularly the expanded second partial stream and the hydrogen feed stream are guided.

In certain embodiments, the feed gas stream is provided with a pressure equal or above 13 bar(a). In certain embodiments, the feed gas stream is provided with a pressure in the range of 15 bar(a) to 75 bar(a). In certain embodiments, the feed gas stream is provided with a pressure in the range of 25 bar(a) to 50 bar(a).

In certain embodiments, the feed gas stream is provided by compressing a feed gas stream comprising hydrogen at ambient temperature to a pressure of at least 15 bar(a), particularly in the range of 15 bar(a) to 75 bar(a), more particular in the range of 25 bar(a) to 60 bar(a), with at least one compressor, wherein particularly the compressor is a reciprocating piston compressor with at least one compressor stage, or an ionic liquid piston compressor.

In certain embodiments, the cooled feed gas stream is expanded in a fourth expansion device, thereby cooled. In certain embodiments, the fourth expansion device is a turbo-expander or a throttle valve. In certain embodiments, the fourth expansion device is a combination of a turbo-expander and a throttle valve.

In certain embodiments, the cooled feed gas stream is expanded in the fourth expansion device to a storage pressure and thereby further cooled, particularly within said second cooling step, wherein particularly the storage pressure is in the range of 1 bar(a) to 3.5 bar(a), more particular in the range of 1.8 bar(a) to 2.5 bar(a), even more particular equal or close to the ambient pressure.

BRIEF DESCRIPTION OF THE FIGURES

In the following further features and advantages of the present invention as well as preferred embodiments are described with reference to the FIGURE, wherein FIG. 1 shows a schematical illustration of a method according to an embodiment of the invention;

DESCRIPTION OF EMBODIMENT

The invention includes a refrigerant mixture for a closed-loop refrigeration cycle for large-scale liquefiers. The mixture is optimized in terms of plant energy-efficiency and total costs, while reducing the total count of process rotating equipment as well as the plant operational complexity and capital costs. Plant availability and maintainability is increased. Compared to known technology for cold refrigeration cycles in large-scale hydrogen liquefaction plants, the new invention can reduce specific energy consumption by as much as 30%, thus enabling an economical production of liquid hydrogen on a large-scale for e.g. clean energy applications A preferred plant design and method according to an embodiment of the invention is described in the following with reference to FIG. 1.

Hydrogen Liquefaction:

A normal hydrogen (25% para) feed gas stream 11 from a hydrogen production plant is fed to the liquefaction plant 100 with a feed pressure above 15 bar(a), particularly 25 bar(a), and a feed temperature near ambient temperature, particularly 303 K. The feed stream 11 with a mass flow rate above 15 tpd, particularly 100 tpd, is cooled down between 278 K and 308 K, particularly 298 K, with cooling water 75 before entering the precooling cold box 78 through plate-fin heat exchanger 81. A valve can be used to fill the refrigerant inventory for the hydrogen Cold-Cycle 2 directly from the purified feed stream downstream of an adsorber unit 76,77.

The hydrogen feed 11 is cooled in the heat exchanger 81 to the temperature T-PC, particularly 100 K, by the warming-up low pressure streams 42 of three closed loop cycles: a single mixed-refrigerant cycle; a main cooling cycle (more specifically a cold stream 28 of the main cooling cycle); and the secondary cold-cycle (more specifically a cold stream 32 of the final cooling cycle). Embodiments of these cooling cycles are described in more detail below.

At the outlet of the heat exchanger 81, residual impurities are removed from the hydrogen feed gas 12 to achieve a purity of ≥99.99% in the adsorber vessels (adsorber unit) 76, 77 by physisorption. The precooled feed gas 12 enters the adsorber unit 76, 77 at the temperature T-PC, particularly 100 K, which is about 20 K higher than in prior known hydrogen liquefier applications. Advantageously, the catalytic ortho-para conversion at this temperature runs thermodynamically more favourable.

After the feed gas purification, the stream 12 is routed back to the exchanger 81 through the catalyst filled passages of the plate-fin heat exchanger 81, where hydrogen naturally occurring with a para content of 25% is catalytically converted to hydrogen with a para content of about 39% and cooled to the temperature T-PC while the exothermic heat of conversion is being removed by the warming up refrigerants stream 28, 32 and/or 42 in the heat exchanger 81.

The precooled hydrogen feed stream 12 then enters the liquefier cold-box 79 with T-PC e.g. 100 K (between 90 K and 120 K). The feed stream 12 is subsequently cooled and liquefied as well as being catalytically converted to higher hydrogen para-fractions in one plate-fin heat exchanger 82 to 90.

The hydrogen gas feed stream 11 from battery-limits can be further compressed e.g. from 25 bar(a) to higher pressures, e.g. 75 bar(a), to increase process efficiency and to reduce volumetric flows and equipment sizes by means of: a one or two stage reciprocating piston compressor at ambient temperature, a one stage reciprocating piston compressor with cold-suction temperatures after precooling in the heat exchanger 81, or an ionic liquid piston compressor.

Alternatively, an adiabatic ortho-para catalytic converter vessel may be used in the precooling cold box 78 to pre-convert normal-hydrogen (25%) para to a para-fraction near equilibrium in the feed gas stream 12 at the outlet of the adsorber 76,77, before routing the feed gas stream 12 back to the heat exchanger 81.

Detailed Description of the Single Mixed-Refrigerant Precoolinq Cold Cycle

A low pressure mixed-refrigerant stream 42 is routed through suction drum 71 to avoid that entrained liquid droplets from the warmed-up refrigerant stream 41 arrive at the suction side of stage one 63a of compressor 63. The MR composition and the discharge pressure of the first compression stage, between 10 bar(a) and 25 bar(a)a, are optimized to produce an intercooled stream 43 with a relatively high liquid fraction. This reduces the mass-flow of refrigerant 43 that has to be compressed in stage two 63b of the compressor 63. Through a phase separator 72 the intercooled refrigerant stream 43 is separated into a first liquid mixed refrigerant stream 45 that is pumped to the high pressure (particularly in the range of 25 bar(a) to 60 bar(a)) and into a first vapour refrigerant stream 44, which is compressed to high pressure (particularly in the range of 25 bar(a) to 60 bar(a)) by the second stage 63b of compressor 63. Both the vapour 44 and the liquid stream 45 are mixed to a two-phase high pressure mixed-refrigerant stream 41 after compression in the compressor 63. The first vapour stream 44 may be additionally separated into a second liquid phase and a second vapour phase, wherein preferably the first liquid phase 45 and the second liquid phase are unified, pumped together to high pressure and afterwards unified with the second vapour phase before entering the precooling cold box 78. Alternatively, the low pressure mixed refrigerant stream 41 may be compressed by more than two stages. If compression and after-cooling results in the formation of a liquid phase, additionally phase separators may be arranged between the compressor stages.

The two-phase high pressure mixed-refrigerant stream 41 enters the precooling cold-box 78 passing through the heat exchanger 81, where it is precooled to the lower precooling temperature of 100 K. The Joule-Thomson valve 59 expands the precooled mixed-refrigerant stream 41 to an expanded mixed refrigerant stream 42 that has an optimized low pressure level, particularly between 2 bar(a) and 8 bar(a). The refrigerant mixture of the high pressure mixed refrigerant stream 41 is designed to cool down from the temperature T-PC by more than 2.5 K, e.g. from 96 K to 100 K, through the Joule-Thomson expansion. The mixture temperature decrease is designed to maintain a feasible temperature difference between warming up and cooling down streams in the heat exchanger 81 as well as to assure that no component freeze-out occurs in the refrigerant mixture.

The MR composition can be regulated and controlled by the make-up system to adapt to ambient conditions and changed process conditions. The mixed-refrigerant is compressed in a turbo-compressor with at least two stages and inter-stage water cooling to decrease power requirement.

Low temperature precooling is efficiently achieved with a refrigerant mixture optimized specifically for hydrogen liquefaction, wherein the refrigerant preferably contains only four refrigerant components to maintain a manageable plant makeup system. A preferred mixture composition for a precooling temperature in the range of 90 K to 100 K consists of 23 mol. % nitrogen, 29 mol. % methane, 24 mol. % ethane and 0.24 mol. % isobutane. Ethylene may replace the ethane component for precooling temperature above 100 K. For precooling temperatures between 90 K and 100 K, iso-butane may be replaced by 1-butene, isopentane, propane or propylene (due to lower melting points).

The mixture of the mixed-refrigerant may be adapted depending on the precooling temperatures. Accordingly, the mixture may contain nitrogen, methane, ethylene, and n-butane, isobutane, propane, propylene isopentane, isobutane and/or n-pentane for temperatures between 100 K and 120 K (or higher).

For precooling temperatures between 80 K and 100 K, the mixture may contain nitrogen, argon, neon, methane, ethane, propane, propylene, 1-butene.

Also alternatively, the hydrogen feed stream 11 may be precooled to temperatures above 120 K, wherein in this case the mixed-refrigerant preferably contains nitrogen, methane, ethylene, n-pentane For slightly higher process efficiencies, a fifth or more refrigerant mixture components can be added to the refrigerant mixture: iso-butane, iso-pentane, 1-butane, argon, neon, propane or propylene for precooling temperatures between 90 K and 100 K, or n-butane, iso-butane, iso-pentane, propane, propylene or pentane for precooling temperature T-PC particularly above 100 K, and additionally n-pentane, for precooling temperatures above 110 K.

Alternatively or additionally, a liquid nitrogen (LIN) stream at e.g. 78 K, or liquid natural gas (LNG) at e.g. 120 K, can be evaporated in the heat exchanger 81 against the high pressure cooling down streams 21, 31 to provide additional cooling duty to precool the high pressure cooling down streams. The LIN stream, for instance, can reduce the cooling duty, and thus the refrigerant mass flows, to be provided by both the SMR cycle Neon/hydrogen cycle and the HP Hydrogen cycle.

Detailed Description of the Main Cooling Cold Cycle:

A first refrigerant stream is used in the main cooling cycle. In the embodiment described below, a composition including neon and hydrogen is used as an example of a suitable first refrigerant. It will be appreciated that alternative first refrigerant compositions may be used, in accordance with the claims.

In the embodiment described below, a high pressure neon/hydrogen stream 21 is used as an example of the second refrigerant. The high pressure neon/hydrogen (first refrigerant) stream 21 enters the precooling cold-box 78 and is precooled by the warming up streams 28, 32, 42 in the heat exchanger 81 to the precooling temperature T-PC, particularly 100 K. The precooled neon/hydrogen stream 21 is separated into at least two partial streams 22, 23 which flow through two turbine-strings o generate cooling work by nearly isentropic expansions (polytropic) in at least four turbine-expanders (51, 52, 53, 54). In the example herein depicted, two separate turbine-strings are shown. One or maximal two additional separate turbine-strings with respectively one turbine can be added to this configuration at a higher temperature level to match more closely the temperature-enthalpy curve of cooling down and warming up streams in the heat exchangers. All said turbo-expanders 51, 52, 53, 54 are designed to partially recover energy by the means of turbine brakes coupled with a turbo-generator to produce electricity or via at least one compressor stage of Neon compressor 61 (Neon compander) to increase the total plant energy-efficiency.

The HP mixed neon/hydrogen (first refrigerant) stream is cooled down in the heat exchanger 82 further from T-PC by the warming streams of the Cold-cycle 1 and Cold-cycle 2, namely by the low pressure hydrogen stream 32 and the low pressure mixed neon/hydrogen stream 28.

In detail, the high pressure neon/hydrogen stream 21 is separated into two fractions: a first partial high pressure stream 22 and a second partial high pressure stream 23. The first partial stream, (which can also be referred to as a first high pressure fraction) 22 is routed to a first turbine string (51, 52), through which the first partial stream 22 is expanded in turbo-expander 51 to a medium-pressure level MP2 (medium pressure first partial stream 24). The MP2 first partial stream 24 provides cooling duty to the cooling the down streams 11, 21, 31 in heat exchanger 84 as it is partially re-warmed before being expanded again in turbo-expander 52 to the low pressure level (to low pressure first partial neon stream 25). In this way, cooling with turbine string 1 is generated at two different pressure (low pressure and medium pressure) and temperature levels.

The second partial stream (or second high pressure fraction) 23 is subsequently cooled in the heat exchanger(s) 83, 84, 85, and 86 to the temperature of the second turbine string before being expanded in the turbine expander 53 to an intermediate pressure level MP1 (medium pressure second partial stream 26). The medium pressure second partial stream 26 is then re-warmed providing cooling to the cooling down streams 21,31,12 in heat exchanger 88 before finally being expanded to a low pressure level (to the low pressure second partial neon/hydrogen stream 27) in the turbine expander 54. This new process configuration is particularly beneficial for hydrogen feed cooling for two reasons: the specific isobaric heat capacity of the hydrogen feed stream possesses steep gradients or even a peak close to its critical temperature (around 33 K).

The low pressure second partial stream 27 provides cooling duty to the cooling down streams 23, 31 up to the temperature of turbine outlet 52, where it is mixed with the low pressure first partial neon/hydrogen stream 25 to form a mixed stream 28. The mixed stream 28 is warmed up close to ambient temperature as suction stream 28 for neon compressor 61, which is particularly a multi-stage (min. 3) turbo-compressor with stage intercooling. The hot compressor discharge stream 21 is cooled by a water-after-cooler before entering the precooling cold-box 78. The outlet temperature and pressure of neon turbo-expander 54 are optimized in combination with the Hydrogen Cold-cycle 2.

For the refrigerant stream of hydrogen (as given above in embodiment above), optimal cold-end temperatures T-CE are set between 26 K and 33 K (e.g. 28 K.) in order to design the compressor with a beneficial suction pressure above 1 bar(a).

This process configuration in connection with the use of the refrigerant composition is particularly beneficial for hydrogen feed cooling since: depending on the pressure, the specific isobaric heat capacity of the hydrogen feed stream possesses steep gradients in the region close to its critical temperature (particularly between 30 K and 50 K).

Final Cooling Cold Cycle:

A second refrigerant stream is used in the final cooling cycle. In the embodiment described below, hydrogen is used as an example of a suitable second refrigerant. It will be appreciated that alternative second refrigerant compositions may be used, in accordance with the claims.

In the embodiment described below, hydrogen is used as an example of the second refrigerant. Normal hydrogen with an approximate 25% para-fraction may be used as a preferred refrigerant. The high pressure hydrogen refrigerant (second refrigerant) stream 31 is precooled in the heat exchanger 81 (stream 31) to T-PC, particularly 100 K. In the liquefier cold-box 79, the high pressure hydrogen refrigerant 31 is then subsequently cooled down to a temperature around 28 K. At the cold end, the hydrogen cold-cycle provides the cooling for the final liquefaction and final ortho-para conversion and subcooling of the hydrogen feed stream 13, 14. The high pressure hydrogen refrigerant 31 is expanded from high pressure to low pressure in at least one turbine string though at least one turbo-expander 55. In a preferred embodiment a second turbine string with an additional turbo-expander or more turbine strings may be added. If this turbo-expander 55 is to be designed with a dry-gas discharge, the high pressure hydrogen refrigerant 31 is expanded from high pressure to an intermediate pressure, above the critical pressure or to a pressure in the range of 5 bar(a) to 13 bar(a) if no two-phase is generated within the turbine 57 or at the outlet of the turbine 57. Subsequently, the cooled stream is expanded to low pressure 32 through a second Joule-Thomson throttle valve 56 into a gas-liquid separator 74. For a turbo-expander with allowed two-phase discharge, e.g. a wet expander, the high pressure hydrogen refrigerant 31 can be expanded directly to low pressure level 32. Alternatively, a cold liquid piston expander can be employed to expand the high pressure stream 31 directly to low pressure level 32 into the two-phase region. In either case, the low pressure level 32 is fixed to provide a cooling temperature below the feed temperature for saturated or even subcooled liquid (between 20 K and 24 K).

The low pressure hydrogen refrigerant 32 is warmed-up to near ambient temperature providing cooling duty to the cooling down streams in the precooling 78 and liquefier cold-box 79. The warmed low pressure hydrogen refrigerant 32 is compressed in one multi-stage reciprocating piston compressor 62 with inter-stage cooling. The piston compressor 62 is designed with at least three intercooled stages. Alternatively, the low pressure hydrogen refrigerant 32 may be compressed in an ionic liquid piston compressor.

Alternatively, in a further embodiment (not shown), the high pressure second refrigerant 31 is separated into at least two partial streams, wherein the first partial stream is expanded to low pressure level as described above, and the second partial stream is expanded in an additional turbo-expander to a medium pressure level (between high and low pressure) and guided into the expanded first partial stream between two compressor stages, in which the expanded first partial stream is compressed from low pressure level to high pressure level, particularly after a compressor stage, in which the expanded first partial stream is compressed to a pressure level close to the medium pressure level of the partially expanded second partial stream. Such configuration is particularly advantageously, if the first temperature T-CE, provided by the main cooling cycle, is above 32 K.

After cooling the hydrogen feed stream 13 to a temperature equal to the cooled high pressure hydrogen refrigerant 31, e.g. 28 K, the feed stream is catalytically converted to a para-fraction slightly below the equilibrium para-fraction at T-CE or as required. The stream 13 is then expanded by the means of at least one turbo-expander from feed pressure to an intermediate pressure above the critical pressure or to a pressure in the range of 5 bar(a) to 13 bar(a) if no two-phase is generated within the turbine 57 or at the outlet of the turbine 57. Subsequently, the expanded and cooled feed stream 14 is further expanded through a further Joule-Thomson throttle valve 58 to the low pressure level near the final product storage pressure e.g. 2 bar(a).

For turbo-expanders allowing a two-phase discharge, the cooled hydrogen feed stream 13 can be directly expanded into the two-phase region to the final product storage pressure e.g. 2 bar(a). For shaft powers around 50 kW or higher, as in large-scale liquefiers with e.g. 100 tpd capacity, a turbo-expander with energy-recovery via a turbo-generator can be employed to raise energy-efficiency. Alternatively, a cold liquid piston expander can be employed to directly expand the feed stream from the intermediate pressure level, e.g. 13 bara, to the low pressure level near the final product storage pressure. In either case, the two-phase hydrogen feed stream 14 is finally cooled and catalytically converted in the last part of the plate-fin heat exchanger 91 against the warming up Cold-cycle 2 refrigerant stream 32.

Alternatively, in a further embodiment (not shown), a high pressure Helium Brayton cycle is employed as a separate closed-loop refrigerant cycle, instead of the above described hydrogen cold cycle, to provide the cooling duty at temperatures below the cold-end T-CE. In this case, compressor 62 is a helium compressor. The high pressure helium stream is expanded and is routed back to the cold-box 79 in a separate closed-loop cycle. The high pressure helium Brayton refrigeration cycle is capable of providing refrigeration at temperatures significantly below the normal boiling point of the hydrogen feed, due to the low melting point of helium. Helium is expanded in a turbo-expander from high pressure in range of 50 bar(a) to 70 bar(a) to low pressure in the range of 5 bar(a) to 25 bar(a) to provide cooling duty for the cooling and liquefaction of the hydrogen feed stream. The helium compression from low pressure to high pressure at near ambient temperature can be implemented through highly-efficient new ionic liquid piston compressor technology (Linde Ionic Compressor).

With this configuration, a liquid hydrogen product stream 15 at the outlet can be generated as saturated liquid or even subcooled liquid, a final para-fraction of F-LH2-01 above 99.5% can be reached, depending on temperature of the liquid hydrogen product.

The method of the invention offers the following advantages:

In summary:
Significant decrease in specific energy demand and specific costs for the production of liquid hydrogen on a large-scale compared to prior known technologies;
Combination of the advantages of both neon and normal-hydrogen as refrigerants in one optimal neon-hydrogen mixture: compared to pure neon, normal-hydrogen is a thermodynamically more efficient refrigerant for hydrogen feed cooling and liquefaction. With the designed neon-hydrogen mixture, required pressure ratios are feasible with state-of-the art turbo-compressors and turbo-expander machines both at warm and cold suction temperatures (due to the optimal neon refrigerant fraction in the mixture).
The designed mixture with a comparatively high hydrogen mole fraction modifies the vapour-liquid equilibrium: a turbine Brayton cyc/e can provide cooling at low temperatures at relatively moderate expanded pressure levels, thus reducing compressor suction volumes.
Compared to pure neon refrigerant, the designed mixture with hydrogen reduces the fluid heat capacity ratio. In this way, for instance, the refrigerant warming up during compression and the required cooling duty are reduced The low melting point of hydrogen reduces the mixture melting point, particularly at higher hydrogen mole fractions, thus avoiding clog formation within the process even at a temperature below the melting point of pure neon.

Turbo-compressors for helium and hydrogen at ambient temperature would require complex designs with multiple machines and a high number of stages per machine. Screw compressors for helium or hydrogen have a low isentropic efficiency and relatively small available frame-sizes. Reciprocating compressor frame sizes are limited in maximum practicable volumetric suction flow rate. Prior known designs for helium, hydrogen or neon with reciprocating compressors for large-scale hydrogen liquefiers with up to 150 tpd capacity would require multiple very large piston compressors to operate in parallel. This would be an unfavourable design in terms of investment costs, plant maintainability, reliability and availability. Due to the comparatively high feasible stage pressure ratio of neon in turbo-machinery, a single multi-stage turbo-compressor machine is practicable with the here presented neon-hydrogen mixture, even for high hydrogen liquefaction capacities e.g. 100 to 200 tpd.

Compared to pure helium and hydrogen refrigerant, the designed neon-hydrogen mixture allows the design of highly efficient state-of-the art turbo-expanders with moderate (technically viable) rotational speeds for the high cooling duty cold-cycle. Also, high expansion pressure ratios can be achieved by the presented hydrogen-neon mixture: the number of required turbo expanders stages in series can thus be reduced. The moderate speeds are particularly favourable for the design of an electrical and/or mechanical energy recovery system via the coupling of a turbo generator and/or a turbo compressor (booster).

The total rotating equipment count is significantly reduced compared to known technologies. Plant capital as well as operating and maintenance costs can be significantly decreased through the use of turbo machinery Alternatively to the state-of-the-art warm suction compression near ambient temperature, the cold refrigeration cycle compression can be performed at cryogenic suction temperatures (cold compression), e.g. below 220 K, to.reduce compressor volumetric suction flow (frame size) and number of required compression stages and/or increase the hydrogen mole fraction in the refrigerant mixture.

REFERENCE NUMERALS

| | |
|---|---|
| 100 | liquefaction plant |
| 11 | eed stream |
| 12 | precooled feed stream |
| 13 | cooled feed stream |
| 14 | expanded cooled feed stream |
| 15 | Liquid product stream |
| 21 | high pressure first refrigerant stream |
| 22 | high pressure first partial first refrigerant stream |
| 23 | second high pressure partial first refrigerant stream |
| 24 | medium pressure first partial first refrigerant stream |
| 25 | low pressure first partial first refrigerant stream |
| 26 | medium pressure second partial first refrigerant stream |
| 27 | low pressure second partial first refrigerant stream |
| 28 | low pressure first refrigerant stream (unified) |
| 31 | high pressure second refrigerant stream |
| 32 | low pressure second refrigerant stream |
| 33 | vapour phase of low pressure second refrigerant stream |
| 34 | liquid phase of low pressure second refrigerant stream |
| 41 | high pressure mixed refrigerant stream |
| 42 | low pressure mixed refrigerant stream |
| 43 | medium pressure mixed refrigerant stream |
| 44 | vapour phase of medium pressure mixed refrigerant stream |
| 45 | liquid phase of medium pressure mixed refrigerant stream |
| 51,52,53,54,55,57 | turbo-expander |
| 56,58,59 | throttle valve |
| 61 | turbo compressor |
| 62 | piston compressor |
| 63a | first compressor stage |
| 63b | second compressor stage |
| 64,65 | pump |
| 71 | suction drum |
| 72,73,74 | phase separator |
| 75 | water cooling |
| 76,77 | adsorber vessel |
| 78 | pre cooling cold box |

| | |
|---|---|
| 79 | liquefier cold box |
| 81,82,83,84,85,86,87,88,89, 90,91 | heat exchanger block or heat exchanger filled with ortho-para catalyst (hatched area) |

The invention claimed is:

1. A method for liquefying a feed gas stream comprising hydrogen or helium, the method comprising:
   providing a feed gas stream comprising hydrogen or helium, wherein said feed gas stream has an initial temperature,
   precooling said feed gas stream from said initial temperature to an intermediate temperature yielding a precooled feed gas stream,
   cooling said precooled feed gas stream from said intermediate temperature to a temperature equal to or below the boiling temperature or the critical temperature of said gas,
   wherein
   said precooled feed gas stream is cooled to said temperature equal or below the boiling temperature or the critical temperature of said gas in a first cooling step with a first refrigerant stream, wherein said first refrigerant stream is expanded, thereby producing cold, or
   said precooled feed gas stream is cooled to a first temperature in a first cooling step with a first refrigerant stream, wherein said first refrigerant stream is expanded, thereby producing cold,
   wherein said cooled feed gas stream is further cooled from said first temperature to said temperature equal to or below the boiling temperature or critical temperature of said gas in a second cooling step with a second refrigerant stream, wherein said second refrigerant stream is expanded, thereby producing cold,
   wherein said first refrigerant stream and/or said second refrigerant stream has a refrigerant composition comprising neon and hydrogen and the amount of hydrogen is ≥60 mole % and the amount of neon is ≤20%,
   wherein said precooled feed gas stream is cooled in said first cooling step by a first closed loop cooling cycle, comprising:
   providing said first refrigerant stream with a first pressure,
   separating said first refrigerant stream at least into a first partial stream and a second partial stream,
   expanding said first partial stream in a first expansion device to a first intermediate pressure yielding a partially expanded first partial stream and/or to a second pressure yielding an expanded first partial stream,
   expanding said second partial stream to a third pressure in a second expansion device yielding an expanded second partial stream,
   guiding said expanded second partial stream and said precooled feed gas stream such that heat can indirectly be transferred between said expanded second partial stream and said precooled feed gas stream, thereby cooling the precooled feed gas stream to said first temperature or to said temperature equal or below the boiling temperature or the critical temperature of said gas,
   merging said partially expanded first partial stream or said expanded first partial stream with said expanded second partial stream yielding an expanded first refrigerant stream, and
   compressing said expanded first refrigerant stream to the first pressure yielding said first refrigerant stream, and
   wherein said cooled feed gas stream is cooled in said second cooling step in a second closed loop cooling cycle which is separate from said first closed cooling cycle.

2. The method according to claim 1, wherein said feed gas is hydrogen.

3. The method according to claim 1, wherein said second refrigerant stream has a refrigerant composition comprising 10 mol. % to 90 mol. % neon and hydrogen.

4. The method according to claim 1, wherein said refrigerant composition consists of:
   40 mol. % neon and 60 mol. % hydrogen, or
   30 mol. % neon and 70 mol. % hydrogen, or
   20 mol. % neon and 80 mol. % hydrogen, or
   10 mol. % neon and 90 mol. % hydrogen.

5. The method according to claim 1, wherein said refrigerant composition has a molecular weight in the range of 3.83 g/mol to 13 g/mol.

6. The method according to claim 1, wherein
   said second refrigerant stream comprises: hydrogen, helium, a mixture of hydrogen and helium, or a mixture containing hydrogen and 10 mol. % to 20 mol. % neon.

7. The method according to claim 1, wherein
   said first partial stream is expanded to said first intermediate pressure yielding said partially expanded first partial stream, and
   said partially expanded first partial stream and said second partial stream are guided such that heat can indirectly be transferred between said partially expanded first partial stream and said second partial stream, thereby cooling said second partial stream, and said partially expanded first partial stream is further expanded to said second pressure yielding said expanded first partial stream.

8. The method according to claim 1, wherein
   said second partial stream is expanded to a second intermediate pressure yielding a partially expanded second partial stream, and
   said partially expanded second partial stream and said precooled feed gas stream and/or said second refrigerant stream are guided such that heat can indirectly be transferred between said partially expanded second partial stream and said precooled feed gas stream and/or said second refrigerant stream.

9. The method according to claim 1, wherein said second cooling cycle comprises:
   providing said second refrigerant stream with a fourth pressure,
   expanding said second refrigerant stream in an expansion device to a fifth pressure yielding an expanded second refrigerant stream,
   guiding said expanded second refrigerant stream and said cooled feed gas stream such that heat can indirectly be transferred between said expanded second refrigerant stream and said cooled feed gas stream, thereby cooling said cooled feed gas stream to said temperature equal or below the boiling temperature or the critical temperature of said feed gas, compressing said expanded second refrigerant stream to said fourth pressure yielding said second refrigerant stream.

10. The method according to claim 1, wherein said feed gas stream is provided with a pressure equal to or above 13 bar(a).

11. The method according to claim 1, wherein said cooled feed gas stream is expanded in an expansion device to a storage pressure and thereby further cooled, and
wherein said storage pressure is in the range of 1 bar(a) to 3.5 bar(a).

12. The method according to claim 1, wherein said first refrigerant has a refrigerant composition containing ≤20% neon.

13. The method according to claim 1, wherein said second refrigerant has a refrigerant composition comprising 20 mol. % to 80 mol. % neon and hydrogen.

14. The method according to claim 1, wherein said second refrigerant has a refrigerant composition comprising 50 mol. % to 70 mol. % hydrogen and neon.

15. The method according to claim 1, wherein said second refrigerant has a refrigerant composition comprising 55 mol. % to 65 mol. % hydrogen and neon.

16. The method according to claim 1, wherein
said precooled feed gas stream is cooled to a first temperature in a first cooling step with a first refrigerant stream, wherein said first refrigerant stream is expanded, thereby producing cold, and said cooled feed gas stream is further cooled from said first temperature to said temperature equal to or below the boiling temperature or critical temperature of said gas in a second cooling step with a second refrigerant stream, wherein said second refrigerant stream is expanded, thereby producing cold; and
wherein said second refrigerant stream consists of: hydrogen, helium, a mixture of hydrogen and helium, or a mixture of hydrogen and 10 mol. % to 20 mol. % neon.

17. The method according to claim 1, wherein said cooled feed gas stream is expanded in a fourth expansion device to a storage pressure and thereby further cooled within said second cooling step, and wherein said storage pressure is in the range of 1 bar(a) to 3.5 bar(a).

18. The method according to claim 11, wherein said storage pressure is in the range of 1.8 bar(a) to 2.5 bar(a).

19. The method according to claim 1, wherein
the first refrigerant stream comprises 30 mol. % to 40 mol. % neon, and 60 mol. % to 70 mol. % hydrogen,
the first pressure is above 20 bar(a), and
the second and/or third pressure is above 4 bar(a).

20. The method according to claim 1, wherein
the first refrigerant stream comprises 30 mol. % to 40 mol. % neon, and 60 mol. % to 70 mol. % hydrogen,
the first pressure is between 30 bar(a) and 40 bar(a), and
the second and/or third pressure is between 4 bar(a) and 6 bar(a).

21. The method according to claim 1, wherein
the first refrigerant stream comprises 30 mol. % to 40 mol. % neon, and 60 mol. % to 70 mol. % hydrogen,
the first pressure is above 40 bar(a), and
the second and/or third pressure is above 6 bar(a).

22. The method according to claim 1, wherein
the first refrigerant stream comprises 30 mol. % to 40 mol. % neon, and 60 mol. % to 70 mol. % hydrogen,
the first pressure is between 50 bar(a) and 80 bar(a), and
the second and/or third pressure is between 8 bar(a) and 12 bar(a).

* * * * *